United States Patent
Cote et al.

(10) Patent No.: US 11,816,166 B2
(45) Date of Patent: *Nov. 14, 2023

(54) DOCUMENT ROUTING BASED ON DOCUMENT CONTENTS

(71) Applicant: SERVICENOW CANADA INC., Montreal (CA)

(72) Inventors: Marie-Claude Cote, Montreal (CA); Alexei Nordell-Markovits, Montreal (CA); Andrej Todosic, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/279,640

(22) PCT Filed: Sep. 26, 2019

(86) PCT No.: PCT/CA2019/051377
§ 371 (c)(1),
(2) Date: Mar. 25, 2021

(87) PCT Pub. No.: WO2020/061701
PCT Pub. Date: Apr. 2, 2020

(65) Prior Publication Data
US 2021/0390145 A1 Dec. 16, 2021

Related U.S. Application Data

(60) Provisional application No. 62/738,332, filed on Sep. 28, 2018.

(51) Int. Cl.
*G06F 16/00* (2019.01)
*G06F 16/93* (2019.01)
*G06N 3/042* (2023.01)

(52) U.S. Cl.
CPC ............ *G06F 16/93* (2019.01); *G06N 3/042* (2023.01)

(58) Field of Classification Search
CPC .............................. G06N 3/0427; G06N 3/08
See application file for complete search history.

(56) References Cited

U.S. PATENT DOCUMENTS

| | | | |
|---|---|---|---|
| 2004/0015557 A1* | 1/2004 | Horvitz | G06F 16/353 709/206 |
| 2006/0161423 A1 | 7/2006 | Scott et al. | |
| 2007/0100603 A1 | 5/2007 | Warner et al. | |
| 2009/0006366 A1 | 1/2009 | Johnson et al. | |

(Continued)

*Primary Examiner* — Anhtai V Tran
(74) *Attorney, Agent, or Firm* — Fasken Martineau DuMoulin LLP; Serge Lapointe

(57) ABSTRACT

Systems and methods for routing a document based on the contents of this document. The content of this document is first subjected to a recognition process and then the result is subjected to multiple types of analysis. Based on the results of the analysis (including contextual analysis), a destination is determined along with any timelines detailed in the document. As well, a severity of the document, indicating the severity of consequences if the document is not handled quickly, is determined. Based on these, an urgency tag and/or a severity tag are assigned to the document. A final destination is determined based on the output of the analysis of the severity, the urgency, and of the destination.

9 Claims, 1 Drawing Sheet

(56) References Cited

U.S. PATENT DOCUMENTS

| | | | |
|---|---|---|---|
| 2009/0030860 A1* | 1/2009 | Leitheiser | H04L 45/08 |
| | | | 706/15 |
| 2012/0020471 A1 | 1/2012 | Erhart et al. | |
| 2015/0142704 A1* | 5/2015 | London | G06Q 10/10 |
| | | | 706/11 |
| 2017/0372231 A1 | 12/2017 | Ghatage et al. | |
| 2018/0219889 A1* | 8/2018 | Oliner | G06N 3/08 |
| 2018/0322403 A1* | 11/2018 | Ron | G06N 5/04 |
| 2018/0349817 A1* | 12/2018 | Goel | G06Q 10/0635 |
| 2019/0182193 A1* | 6/2019 | Moskowitz | G16H 50/30 |
| 2019/0378397 A1* | 12/2019 | Williams, II | G06N 5/046 |

\* cited by examiner

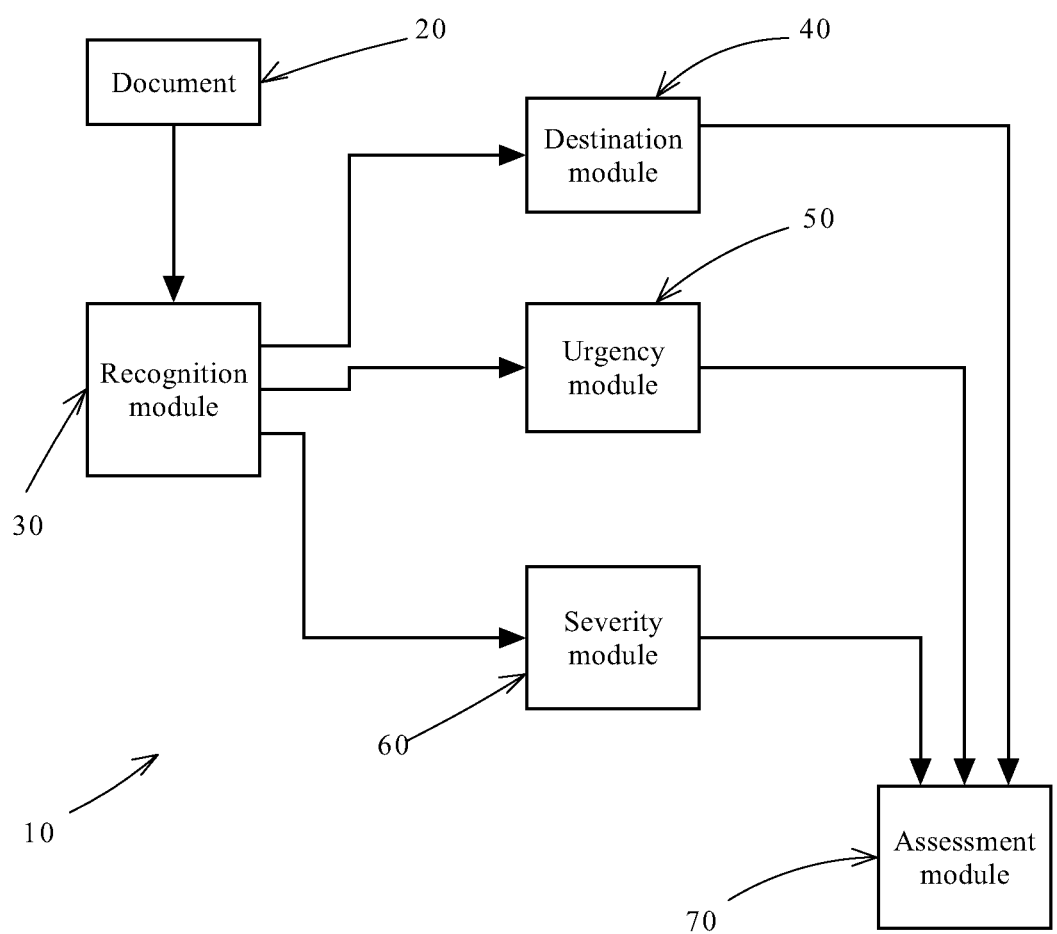

DOCUMENT ROUTING BASED ON DOCUMENT CONTENTS

CROSS REFERENCE TO RELATED APPLICATIONS

The present application is a U.S. National Phase Application pursuant to 35 U.S.C. § 371 of International Application No. PCT/CA2019/051377 filed Sep. 26, 2019, which claims priority to U.S. Provisional Patent Application No. 62/738,332 filed Sep. 28, 2018. The entire disclosure contents of these applications are herewith incorporated by reference into the present application.

TECHNICAL FIELD

The present invention relates to robotic process automation (RPA) systems that perform repetitive tasks based on a programmed set of instructions. More specifically, the present invention relates to the use of machine learning as applied to such automation systems to enhance the capabilities of such systems.

BACKGROUND

The rise of automation since the late 20th century is well documented. The application of such automated systems in manufacturing is well-known. These automated systems that perform pre-programmed, repetitive tasks are now being used not just in manufacturing but in other areas of industry and human activity. These have been used in scientific laboratories to carry out repetitive tasks that may be prone to error when executed by humans. They are now also being used industries where they can provide error free execution of mundane, repetitive tasks. One major development in the past few years has been the rise of RPA (Robotic Process Automation). Instead of having a physical robot perform repetitive physical tasks, a robotic agent is used to perform repetitive virtual tasks on a graphical user interface. As an example, copying data from one form into another form and then saving the result is a task that RPA agents are well-suited to perform. Not only are the agents fast, they are also accurate.

While robots are useful and while they excel in performing such repetitive tasks, they are not very robust or resilient nor do they provide the judgment that some tasks require. They are able to execute tasks only for circumstances that they are specifically programmed for. As such, deviations from their pre-programmed circumstances and context will cause these systems to fail at their tasks. As an example, in manufacturing, each component has to be at a very specific location from which a robot can locate and retrieve that component. If a component is located at a slightly different location, the robot may be unable to retrieve the component and may generate an error or system failure. The robot is unable to judge or determine that the component must be picked up at a slightly different location.

In tasks that involve the manipulation of data and/or the retrieval and/or placement of data, robots or robotic agents suffer from the same issues. If a robotic agent is programmed to retrieve specific data from a user interface and then to place that data in another user interface, those two user interfaces must be exactly as the robotic agent expects them to be. Any changes or deviations from the expected user interface may result in errors or in the failure of the robotic agent in executing the task. As an example, if the robotic agent is expecting a radio button at a specific spot in the user interface, that radio button cannot be moved to another spot as the robotic agent will not know how to handle this change. As well, if a robotic agent is programmed to route data to a specific location, the robotic agent cannot handle the nuances of that data unless specifically programmed to do so. Such programming, of course, can take hundreds of man-hours of effort and resources. Any small deviations from what robotic agents expect when executing their preprogrammed tasks will, invariably, produce errors unless an inordinate amount of time, effort, and resources is expended to cover off all possible permutations of what the robotic agents may encounter.

In sum, current automated systems are only as good as the programs or software that operate on them. These systems are, for lack of a better term, "unintelligent". If programmed to process data, these systems blindly process the data, even if there are issues with the data or even if the data indicates a need for urgency. These systems are thus incorrigibly deterministic. Any errors encountered in the data are happily ignored unless the system is specifically programmed to find such errors.

There is therefore a need for systems and methods that allow such automated systems to be more robust and to be more flexible and resilient when encountering circumstances that might not be explicitly programmed into the system. Preferably, such systems and methods are such that they do not require painstakingly programming not only each and every possibility to be encountered but also what contingencies to follow for each one of these possibilities.

SUMMARY

The present invention provides systems and methods for routing a document based on the contents of this document. The content of this document is first subjected to a recognition process and then the result is subjected to multiple types of analysis. Based on the results of the analysis (including contextual analysis), a destination is determined along with any timelines detailed in the document. As well, a severity of the document, indicating the severity of consequences if the document is not handled quickly, is determined. Based on these, an urgency tag and/or a severity tag are assigned to the document. A final destination is determined based on the output of the analysis of the severity, the urgency, and of the destination.

In a first aspect, the present invention provides a method for determining a destination for a document, the method comprising
   a) receiving said document;
   b) analyzing a content of said document using machine learning to determine a destination for said document;
   c) analyzing said content using machine learning to determine timelines noted in said document;
   d) analyzing said content using machine learning to determine a severity of consequences as indicated by said document;
   e) determining a routing of said document based on at least a result of step a) and determining which final destination to send said document to based at least on a result of step d);
   wherein a severity tag is assigned to said document based on a result of step c).

In a second aspect, the present invention provides a method for determining a destination for a document, the method comprising:
   a) receiving said document;

b) analyzing a content of said document using machine learning to determine a destination for said document, said destination being related to a subject of said document;

c) analyzing said content using machine learning to determine a mood of a writer of said document;

d) determining a routing for said document to based on a result of step a) and determining which final destination to send said document to based on a result of step c).

In a third aspect, the present invention provides a system for determining a destination for a document, the system comprising:

a recognition module to determine content in said document;

a destination module for determining a destination to which contents of said document relate to;

an urgency module for determining timelines noted in said document; and a severity module for determining a severity of consequences for said document;

an assessment module receiving outputs of said destination module, said urgency module, and said severity module to determine where to route said document based on said outputs;

wherein said destination module, said urgency module, and said severity module receives an output of said recognition module and determines their respective outputs based on an analysis of said output of said recognition module.

BRIEF DESCRIPTION OF THE DRAWINGS

The embodiments of the present invention will now be described by reference to the following FIGURE, in which identical reference numerals in different figures indicate identical elements and in which:

FIG. 1 is a block diagram of a system according to one aspect of the invention and which may be used to implement a method according to another aspect of the invention.

DETAILED DESCRIPTION

The present invention relates to the use and provision of machine learning and artificial intelligence methods and systems for use in RPA and in RPA executed tasks. As noted above, automated systems have been used in many fields. These systems are generally used to perform multiple pre-programmed repetitive tasks. Machine learning and systems relating to machine learning can provide such automated systems with the capability to adjust to changing conditions and circumstances, thereby providing robustness, resilience, and adaptability to these systems.

In one aspect of the present invention, robustness is provided to RPA by allowing automated systems to be adaptable to various changing circumstances and to a large number of potential factors. In this aspect of the present invention, a document management and routing system is presented. This document management system receives a document and determines, based on the content and on the analysis of that content, the best destination and/or person to deal with the document. In many instances, the routing of documents such as letters, emails, faxes, and other mostly text-based documents is done by humans or is performed by rules-based software agents. Unfortunately, these rules-based agents are unable to recognize and/or assess the content of the documents except perhaps in a most rudimentary manner Thus, a letter detailing a complaint about billing may be routed to the accounting department but an irate customer may feel even more frustrated if that letter is lumped in with hundreds of accounts payable correspondence. As well, an email that may have peripherally mentioned the IT department (but is really concerned with personnel or HR) may be routed, mistakenly, to a tech support person in the IT department. Finally, current systems are unable to gauge the urgency of correspondence. Using an URGENT tag in an email and detailing the department to which the email relates may assist in routing the email. However, there is no guarantee that the correspondence will be prioritized by the system.

This aspect of the present invention can be integrated with a suitable RPA agent that sorts and/or routes correspondence within an organization. The method of the present invention involves receiving the document and then performing a content recognition process on the document. Once the content of the document been recognized (i.e., the content has been "read"), the result can then be processed to thereby be analyzed using multiple methods, including passing the recognized content through a number of modules, a destination module, an urgency module, and a severity module. These modules can operate in turn (i.e. sequentially) or the recognition module product (i.e. the recognized content) can be sent to each of the modules in parallel. The destination module would read the recognition module product and, based on the content, determine the subject of the document and the department or section to which the document is to be routed. As an example, a document asking for assistance with a broken mouse or a malfunctioning server would be routed to the IT department or whichever department handles IT issues. As well, an email concerning accounts receivable would be sent to accounts receivable while a letter explaining that the company needs to pay soon or litigation would commence would be routed to accounts payable. As can be imagined, the subject of the document (whether it is a correspondence or not) can be determined by the content of the document. Thus, specific words, specific phrases, and maybe even file numbers can be used to determine which department should deal with the document. Other indications as to the relevant department for a document, including contextual clues in the document, may be used to determine its routing. It should be clear that other methods of analysis, including contextual analysis, word choice, punctuation analysis, style analysis, writer intent analysis and others may also be used to determine the destination for the document.

Regarding the urgency module, the system can send the recognized content (i.e., the recognition module product) to the urgency module to determine timelines that may be relevant to the document or to the matter being addressed by the document. As an example, if a document mentions a deadline that is 3 months from the date of the document, the urgency module can extract the date of the document as well as the deadline mentioned. The urgency module can then calculate that deadline based on the data points of the document's date as well as the indication that the deadline is 3 months from that date. Similarly, if a deadline is mentioned as being on a certain date, then that date is noted by the urgency module and, depending on the current date the document is being processed, a suitable urgency tag can be assigned to the document. It should be clear that the urgency tag can have varying levels of urgency, all of which are dependent on how soon an upcoming relevant date or deadline is approaching. Thus, a very urgent tag may be placed on a document with a deadline that is due in the next week. A less urgent tag may be placed on a document with a deadline that is due in the next month. Finally, a not urgent tag may be placed on a document with a deadline due beyond next month. Of course, the timelines used for the urgency tags are implementation dependent and are dependent on the organization using the system. In addition to the above, the system may use other forms of analysis to assist in determining any timelines that may be relevant to the document. As such, an analysis as to the intent of the writer regarding the desired timeline to address the concerns in the document (whether explicitly expressed or simply implied) may be performed. Such timelines may also be taken into account by the urgency module.

In a similar manner, a severity tag may be placed on a document depending on the severity of the document as denoted by the contents of the document. It should be clear that, in this implementation, "severity" may be noted as being the severity of the consequence if the document is not addressed quickly. (Other definitions of what constitutes "severity" may, of course, be used.) Severe consequences may include litigation, a customer leaving, a regulator being notified, potential danger to life and/or limb, potential damage to property, potential violence directed at the company and/or its agents/employees, and other dire consequences. The severity of a document can be determined, again, based on the contents of the document. Thus, the severity module can analyze the contents of the recognition module product to determine if there are any indications of a potentially severe consequence in the document. If such indications are present, these indications can be ranked and, based on the severity of the consequence or the severity of the indication (such as the writer's mood), a suitable tag can be assigned to the document. As an example, an email that indicates an irate customer complaining about a specific department can be considered as being in the severity spectrum. Similarly, a letter mentioning a potential lawsuit against the company can be considered to have a potentially severe consequence. As well, an email detailing a dangerous situation (e.g. a blown gas main) would be very high on the severity spectrum, as would an email notifying of an active shooter situation.

It should be clear that the severity of a document can be determined by not just an analysis of the contents of the document but also the tone and choice of words in the document. Thus, a document filled with expletives and other indications of frustration, anger, and other negative emotions and moods on the part of the writer may trigger a higher level of severity in the spectrum. As well, the extensive use of capital letters, exclamation marks, and other indications of shouting and/or a loud voice in a document can be used as an indication of the writer's mood. It should be clear that, even if the document does not contain an explicit indication of a severe consequence, the tone and/or other surrounding circumstances of the document may indicate that the document should be dealt with as if there was a severe consequence associated with it. As an example, a clearly irate customer's email, while possibly not issuing threats to the company, should be dealt with quickly as the customer may leave or, worse for the company, may provide negative comments about the company through social media outlets. The severity of a document can be determined by way of various analyses of the documents contents (i.e., the recognized content). Thus, the analysis may attempt to determine the writer's mood and intent. In addition, contextual analysis may take into account not just the explicit content in the document but what the document implies such as hostility, demeanor, desire, and intended end result.

Once a destination has been determined, a suitable urgency tag has been assigned, and a suitable severity tag has been associated with the document, these various tags and destinations may need to be reconciled. Thus, if a document is detailed to be routed to accounting with a low urgency (e.g. the deadline is not for another six months), but the severity tag indicates a high severity, this document may be routed to a different destination (e.g. a different department in an organization). This different destination may be one that is more suitable for dealing with severe situations quickly and effectively. Thus, instead of having the document wend through the bureaucracy of an organization, the system can route documents with a high severity tag to a designated emergency department for quicker handling. Similarly, if a document is to be routed to the IT department with a low or non-existent severity tag but with a high urgency tag, the document may be routed to a suitable emergency handling subsection within the IT department. This would allow for a quicker handling of the matter without having to escalate the matter to an extra-departmental group. Of course, if a document is not tagged with a high urgency or with a high severity, then the document can simply be routed to the relevant department and it would be dealt with in due course of that department.

It should be clear that, depending on the implementation, a high severity tag may override a high urgency tag. Thus, while a high urgency tag, by itself, may cause a document to be placed high on a list of documents to be dealt with by a specific destination (e.g. a specific department or a specific person in that department), a high severity tag on another document may be placed higher on that list. The reasoning is that a high severity tag may indicate a severe potential consequence while a high urgency tag simply indicates a looming deadline, the consequences of which may not be as dire as the severe consequence indicated by the severity tag.

Regarding implementation, the system may be implemented using a system as detailed in FIG. 1. In FIG. 1, the system 10 has a document 20 being received by a recognition module 30. The output of the recognition module 30 is received either sequentially or in parallel by a destination module 40, an urgency module 50, and a severity module 60. As noted above, the destination module analyzes the recognized content of the document to determine what department/section is concerned with the contents of the document. The urgency module determines any timelines noted in the document, while the severity module determines if the document indicates that the document needs to be dealt with quickly. It should be clear that the destination module outputs a potential department/section or other destination to which the document should be routed. The urgency module outputs an urgency tag to be associated with the document, the urgency tag being dependent on any timelines/deadlines mentioned or indicated (whether explicitly or implied) in the document. The severity module outputs a severity tag (if applicable) to be associated with the document based on that document's contents. The outputs of these modules are then sent to an assessment module 70. The assessment module 70 determines the final routing of the document based on balancing the various outputs of the destination module, the urgency module, and the severity module.

It should be clear that the assessment module 70 may be implemented such that the severity module output, if applicable, trumps or overrides all the other tags/destinations. Thus, if a high enough severity tag is assigned to the document, that document is sent to a suitable department for emergency or critical handling. If a lower severity tag is assigned to the document, the assessment module may thus simply send the document to the department noted by the destination module with the urgency tag noted by the urgency module. The assessment module may thus reflect the organization's priorities regarding the severity and/or urgency of specific matters. As well, the assessment module 70 may route the document to a user for either confirmation or handling. Depending on the implementation, the module 70 may not route the document to a final destination until a human has confirmed the module's conclusion. Upon receipt of that human confirmation, the module 70 can route the document to the determined final destination. Of course, the user to whom the document is routed or from whom confirmation is requested, may change that final destination.

Regarding the implementation of the various modules of the present invention, these various modules may be implemented using machine learning techniques and methods. As such, each of the various modules may include one or more suitably trained neural networks or similar machine learning structures/methods to perform each module's function. For the destination module, the neural network may be trained using a corpus of documents relating to different matters with an indication of which department each document relates to. Similarly, the urgency module can be trained using a training set with each document in the training set detailing one or more deadlines or timelines. Each document is associated with one or more timelines to thereby train the neural network to determine which deadline or timeline is relevant to the document. As well, the urgency module can be trained to assign different urgency tags to the different documents in the training set. For the severity module, the neural network within the module can be trained using documents that exhibit with varying levels of anger and frustration. The wide range of terms used to express such negative moods is preferably reflected in the training set of documents so that the neural network in the severity module can learn to recognize and distinguish these terms. As noted above, the punctuation and use of capital letters by angry and/or frustrated writers can also prove to be useful. In addition, different threats, emergencies, and other documents detailing alarming potential events may also prove to be useful for training the severity module. Other machine learning techniques that can be used to determine intent, context, desire, and/or mood can also be used.

As for the assessment module 70, this module may also use a neural network to assess and balance what the indications detailed by the outputs of the other modules. Thus, it might be useful to create a training set of various severity tags and urgency tags along with a desired routing result that reflects the company's priorities. As an example, some companies may not put much stock in customer complaints and, as such, a severity tag based on a complaining customer may be overridden by an urgency tag indicating another customer wishing to pay an outstanding bill. Conversely, another company may use a training set such that a severity tag that indicates a complaining customer overrides an urgency tag indicating an upcoming deadline for the IT department. As noted above, these training sets may be generated so that the resulting assessment module reflects the company/organization's values and/or priorities.

It should be clear that the various aspects of the present invention may be implemented as software modules in an overall software system. As such, the present invention may thus take the form of computer executable instructions that, when executed, implements various software modules with predefined functions.

It should be noted that the various aspects of the present invention as well as all details in this document may be implemented to address issues encountered in all manners of business related dealings as well as all manners of business issues. Accordingly, the details in this document may be used in the furtherance of any aims, desires, or values of any department in any enterprise including any end result that is advantageous for the fields of accounting, marketing, manufacturing, management, and/or human resource management as well as any expression, field, or interpretation of human activity that may be considered to be business related.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for determining a destination for a document, the method comprising:
   a) receiving said document;
   b) analyzing a content of said document using a first trained neural network to determine a destination for said document;
   c) analyzing said content using a second trained neural network to determine timelines noted in said document and to determine an urgency tag based on the timelines;
   d) analyzing said content using a third trained neural network to determine a severity tag indicative of a severity of consequences if said document is not addressed, said analyzing comprising performing intent analysis using the third trained neural network;
   e) using a fourth trained neural network, determining a routing of said document based on at least the determined destination and determining which final destination to send said document to based at least on the severity tag and the urgency; and
   f) routing said document to the final destination, thereby potentially preventing the consequence.

2. The method according to claim 1, wherein step d) is accomplished based on determining a mood of a writer of said document.

3. The method according to claim 1, wherein said document is one of: a letter, an email, a fax, and a text-based document.

4. The method according to claim 1, wherein, depending on said severity tag, said document is routed for emergency handling.

5. The method according to claim 1, wherein analyzing said content comprises performing contextual analysis to take into account explicit content and implicit content.

6. The method according to claim 2, wherein step d) is accomplished by determining indications of a potentially severe consequence by analyzing at least one of:
   word choices used by said writer;
   punctuation used by said writer;
   capitalization choices by said writer.

7. The method of claim 6, further comprising ranking the indications of the potentially severe consequences and the severity of the consequences to determine a severity tag.

8. A system for determining a destination for a document, the system comprising:
   at least one processor and at least one non-transitory storage medium, the non-transitory storage medium containing instructions which, when executed by the processor, cause the processor to implement:
      a recognition module to determine content in said document;
      a destination module comprising a first trained neural network for determining a destination to which contents of said document relate to;
      an urgency module comprising a second trained neural network for determining timelines noted in said document; and
      a severity module comprising a third trained neural network for determining a severity of consequences if said document is not addressed, said determining comprising performing intent analysis of said contents using the third trained neural network;
      an assessment module comprising a fourth trained neural network for:
   receiving outputs of said destination module, said urgency module, and said severity module to determine where to route said document to, based on said outputs; and
   routing said document to the final destination, thereby potentially preventing the consequence;
   wherein
      said destination module, said urgency module, and said severity module receives an output of said recognition module and determines their respective outputs based on an analysis of said output of said recognition module.

9. The system according to claim 8, wherein said severity module is configured to perform mood analysis of a writer of the document.

* * * * *